United States Patent [19]

Neches et al.

[11] Patent Number: 4,925,311

[45] Date of Patent: May 15, 1990

[54] DYNAMICALLY PARTITIONABLE PARALLEL PROCESSORS

[75] Inventors: Philip M. Neches, Pasadena; David H. Hartke, Los Angeles; Richard J. Baran, Torrance; Darryl L. Woodcock, Manhattan Beach, all of Calif.; Alexandros C. Papachristidis, Gainesville, Fla.

[73] Assignee: Teradata Corporation, Los Angeles, Calif.

[21] Appl. No.: 828,440

[22] Filed: Feb. 10, 1986

[51] Int. Cl.$^5$ .................................................. G06F 9/00
[52] U.S. Cl. .................... 364/200; 364/229; 364/230; 364/230.3; 364/230.2; 364/230.1
[58] Field of Search ... 364/200 MS File, 900 MS File

[56] References Cited

U.S. PATENT DOCUMENTS

| | | |
|---|---|---|
| 4,099,233 | 7/1978 | Barbagelata et al. |
| 4,219,873 | 8/1980 | Kober et al. ................ 364/200 |
| 4,344,134 | 8/1982 | Barnes . |
| 4,347,498 | 8/1982 | Lee et al. . |
| 4,412,285 | 10/1983 | Neches et al. . |
| 4,445,171 | 4/1984 | Neches . |
| 4,543,630 | 9/1985 | Neches . |
| 4,564,903 | 1/1986 | Guyette et al. ................ 364/300 |

OTHER PUBLICATIONS

Tuomenoksa et al., "Task Scheduling on the PASM Parallel Processing System", IEEE Transactions on Software Engineering, vol. SE. 11, No. 2, Feb. 1985.

Primary Examiner—Raulfe B. Zache
Assistant Examiner—John G. Mills
Attorney, Agent, or Firm—Merchant, Gould, Smith, Edell, Welter & Schmidt

[57] ABSTRACT

A system for dynamically partitioning processors in a multiprocessor system intercoupled by a network utilizes, in association with each processor, a network accessible, locally changeable memory section. An available one of a number of common dynamic group addresses in each of the memories is reserved for a subgroup for the performance of subtasks within an overall task, and members of the group are designated as they receive messages to be processed. The members then locally update status words which establish membership, group validity and semaphore conditions, so that transactions may be initiated, coordinated and terminated with minimum involvement of processors that have no relevant subtasks. When the full task is completed the dynamic group is relinquished for use when a new task is to be undertaken. The system enables many tasks to be carried out concurrently with higher intercommunication efficiency.

20 Claims, 7 Drawing Sheets

FIG. 3

| 0 | Response CMD | Orig. Processor ID |
|---|---|---|
| 0 | Next Message Vector | |
| 0 | DL | KL |
| 0 | Command | Tag (TN) |
| Map Code | | Map Address |
| Data | | |

DSW

FIG. 4

Status Word Conditions

| Valid | Member | Semaphore | Status Indicated |
|---|---|---|---|
| 0 | 0 | 0 | Group Is Available |
| 0 | 0 | 1 | Group Reserved For Validity Test |
| 0 | 1 | 0 | Member Of Group But Not Processor Which Reserved Group |
| 0 | 1 | 1 | Member During Test For Validity |
| 1 | 0 | 0 | Group Is Reserved |
| 1 | 0 | 1 | Group Is Reserved And Test For Validity |
| 1 | 1 | 0 | Group Is Reserved And This Processor Member |
| 1 | 1 | 1 | Group Is Reserved, This Processor Member And Test For Validity In Process |

DYNAMICALLY PARTITIONABLE PARALLEL PROCESSORS

BACKGROUND OF THE INVENTION

Multiprocessor architectures provide powerful computer systems which, by subdivision of tasks between processors, can handle complex problems and manipulate large data bases quickly and reliably. With most architectures, however, the overhead of managing the resources of the system can become so complex and time consuming that it can severely limit system performance. The processors must intercommunicate among themselves, prioritize different messages, and execute various tasks in the most efficient manner. Depending upon the architecture, this has required the development of very complicated software overhead for system resource management.

Such factors, along with the difficulty of writing software and complex procedures for system expansion, have in the past limited the application of multiprocessor systems. Most multiprocessors utilize single or double intercommunication busses with priority being determined in accordance with an assigned hierarchy or on the basis of time. Control functions are exercised by specific processors, or by bus controllers, or by a variety of other means.

Recognizing the extent of these and other problems, a new multiprocessor system has been introduced and is now in widespread use, based upon the concepts shown and described in U. S. Pat. No. 4,412,285 to Philip M. Neches et al and U. S. Pat. Nos. 4,445,171 and 4,543,630 to Philip M. Neches. A significantly different approach is used in these systems, which communicate between processors by an active logic network having a tree configuration and means for prioritizing messages based upon data content. The tree network also broadcasts messages having priority to all processors. Local determinations are made, at the processors, as to messages to be responded to or processed by those processors. Data, status, control and response messages are organized in a coherent priority scheme that, together with the system architecture, greatly reduces the complexity of the overhead functions and enables ready expansion of the system to a very large (e.g. 1,024 processor) configuration. This system has proven to be of unique significance, for example, in deriving complex relational queries from vast data bases which may have hundreds of state of the art processors handling up to $10^{12}$ bytes (terabytes) of stored data. In the relational data base situation the contents must be constantly updated, extracted, processed and modified as entries are made and complex relational queries are answered The referenced patents describe a variety of approaches utilized in communications between processors. All of the processors can be addressed by a broadcast mode, or at the other extreme specific processors can intercommunicate by identification of a particular recipient. Processors can also be designated in accordance with data responsibility ("hashed mode") or as a participant in a pre-identified group. Such groups are established during an initialization process and thereafter are not changed except by returning to initialization. Every message is addressed to all members of the group concurrently, only those processors which are members of the group acknowledge the message and process data contributing to the completion of the given task.

Besides interprocessor communication, a practical system must provide means for external communication Good examples of these needs can be found in the "Backend Processor" configuration described in the referenced patents, in which the multiprocessor system is utilized to update the data base and answer relational data base queries from one or more mainframe computers. Communication with the mainframe is effected by interface processors which usually, but not necessarily, accept assignments from the mainframe system and parse the task into substeps, messages for which are then transmitted into the network.

As the various subtasks are being carried out, it is necessary to be able to monitor progress of the responsible processors toward completion. It is also necessary to be able conveniently to restore the data base if an erroneous or unacceptable condition arises as a transaction is carried out. For example, transfers of funds between accounts may be undertaken before it is subsequently determined that the transaction is invalid because some funds are inadequate. In these circumstances, the already completed steps must be reversed in order to restore data to its prior status. This means that the processors then involved in other subtasks of the aborting transaction should not only restore their data but terminate their efforts, and accept no new subtask assignments for the aborting transaction.

Also, the system operates with Begin Transaction and End Transaction phases needed to achieve coordination and eliminate ambiguity. In the Begin Transaction phase the originating processor, by one or more messages on the network, involves all processors that are members of some process class, preparing them to receive and process the specific "steps" or subtasks of the transaction Similarly, all members of the process class are again involved in the End Transaction phase.

In the system described in the original Neches et al patents, the process class is necessarily large, because such process classes are established during system initialization and are intended to encompass many different types and categories of transactions. Because in many circumstances only a small subgroup of a process class may be involved in a given transaction, there can be an undesired level of overhead activity and processor time committed to overhead functions. The members of a process class are identified and addressed by a Destination Selection Word (DSW), which when used with a hashing algorithm enables any processor containing specifically sought data to recognize the applicability of a query and to respond. Because given tasks often involve only small subgroups within a given DSW, system efficiency can substantially decline when many simple transactions are to be undertaken.

The group subdivisions or "partitions" can change frequently in some workloads. Also, obtaining efficient use of system resources may involve many different group subdivisions, entailing overlapping combinations of processors that are active at the same time, as many different transactions are carried out concurrently by the system. Consequently, there is a need for a capability for partitioning multiple concurrent subgroupings of processors in a system which can also eliminate conflicting states and which can dynamically change these groupings as needed.

The problem of changing the operative relationship of parallel processors has been confronted in a number of different ways in conjunction with specific systems. In U. S. Pat. No. 4,344,134 to George H. Barnes, dated Aug. 10, 1982 and entitled "Partitionable Parallel Processor", for example, a number of parallel processors are each coupled to a control tree having tiers of control nodes. The control nodes may function as roots or non-roots under control signals. When the processors arrive at a Ready State, for beginning a parallel processing instruction, they issue a so-called "I Got Here" signal. The control signals applied to the nodes cause them to function when appropriate as a root node, returning a "GO" signal to initiate the instruction, or as a non-root node, feeding the signal on to the next lower level node. Using the nodes of the control tree in this fashion, the processors may be partitioned into subsystems of parallel processors.

In U. S. Pat. No. 4,347,498 of Robert P. Lee et al, entitled "Method And Means For Demand Accessing And Broadcast Transmission Among Ports In A Distributed Star Network" the Star Network has a number of interconnected nodes, each directly connected to one or more ports. The ports in turn may be connected to different computers or peripheral devices. This arrangement is used for packet switching on a first-come first-served basis from any of the ports so as to broadcast to all of the ports.

U. S. Pat. No. 4,099,233, entitled "Electronic Data-Processing System With Data Transfer Between Independently Operating Miniprocessors", issued July 4, 1978 to Giuseppe Barbagelata et al, employs a control unit to control exchanges between transmitting and receiving processors in a data transfer operation. The control unit establishes "exchange miniprograms", and includes an instruction register for retaining the identities of the transmitting and receiving miniprocessors.

SUMMARY OF THE INVENTION

Systems and methods in accordance with the invention carry out each of a number of tasks by establishing arbitrary subset groupings or partitions within a number of parallel processors using commonly addressable status words whose content can be changed locally. By employing different locations for status words related to different ones of a plurality of tasks, many dynamic groupings of processors can be formed, with each processor carrying out the assigned steps for its tasks asynchronously with respect to others. At the same time, the processors in the system can readily access locally available semaphore and status indications for a given dynamic group to assure coherent and unambiguous flow. Also, it is readily possible for any one processor to participate as a member of one or many such dynamic groups concurrently.

In a preferred implementation, dynamic groups are represented by status words of fixed length in which binary bit positions denote assignment or reservation of the group, membership in the group, and a group semaphore used to avoid conflicting commands and changes. In this preferred implementation, there is a plurality of dynamic group status words maintained as subsequently described at each processor. The state of the dynamic group is affected by the dynamic group status word for that group maintained by each processor in a manner which will be subsequently described. An originating processor determines if a dynamic group is available for assignment, acquires control of it, and designates other processors as prospective group members after it parses the steps to be performed and as it transmits the subtask steps to the appropriate processors. The individual processors can validate their subtasks and insure orderly performance by using the semaphores to block interfering commands and to test the state of other processors in the group. An individual processor updates the local status word as its subtasks are carried out and it progresses toward a final state of relinquishment, or indicates an abort condition. Communications between processors in a dynamic group are specific to that group and largely in the form of brief status inquires and responses. Thus they do not demand processor time or capacity even though many steps are being carried out by individual processors and many communications are being exchanged as steps are assigned, stored, executed and responded to on a queuing basis throughout the system.

In a specific example of a system and method in accordance with the invention, a number of processors are coupled to a multi-node tree network and send competing messages concurrently onto the network. The network compares the messages as they advance through the network and broadcasts that message having data content priority to all processors. A different network interface associated with each processor includes a network accessible high speed random access memory in which a number of common addresses are reserved for 3 bit status words having assignment, member and semaphore significance respectively for dynamic groupings of processors. An originating processor identifies a specific task by parsing individual steps and locates an available random access memory location, which it acquires by entry of an assigned bit. Performance of the task effectively begins when steps are distributed, as by a hashing algorithm, to the responsible processors, which verify the destinations and concurrently identify themselves as members of the group. They then can process the step assigned to them, using the dynamic group location to update local task status, test for the status of other processors involved, eliminate conflicts and ultimately either abort the transaction or normally relinquish the dynamic group in the process.

BRIEF DESCRIPTION OF THE DRAWINGS

A better understanding of the invention may be had by reference to the following description, taken in conjunction with the accompanying drawings, in which:

FIG. 3 is a diagrammatic representation of a message format for data messages used in the system of FIG. 1;

FIG. 4 is a diagrammatic representation of status message formats for use in the system of FIG. 1;

DETAILED DESCRIPTION OF THE INVENTION

Figure 1A:
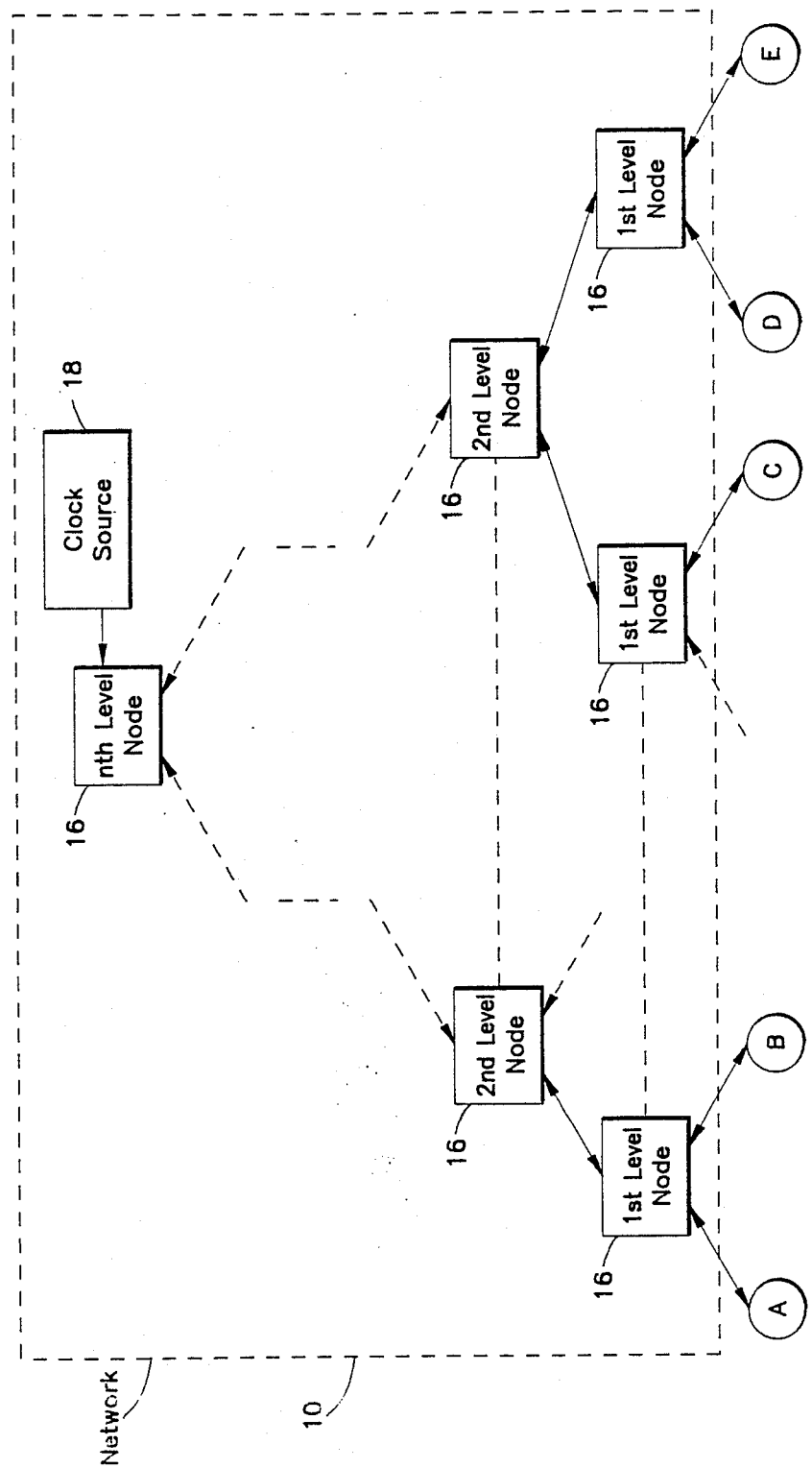
FIGS. 1A and 1B are block diagram representation of one example of a system in accordance with the invention.
Figure 1B:
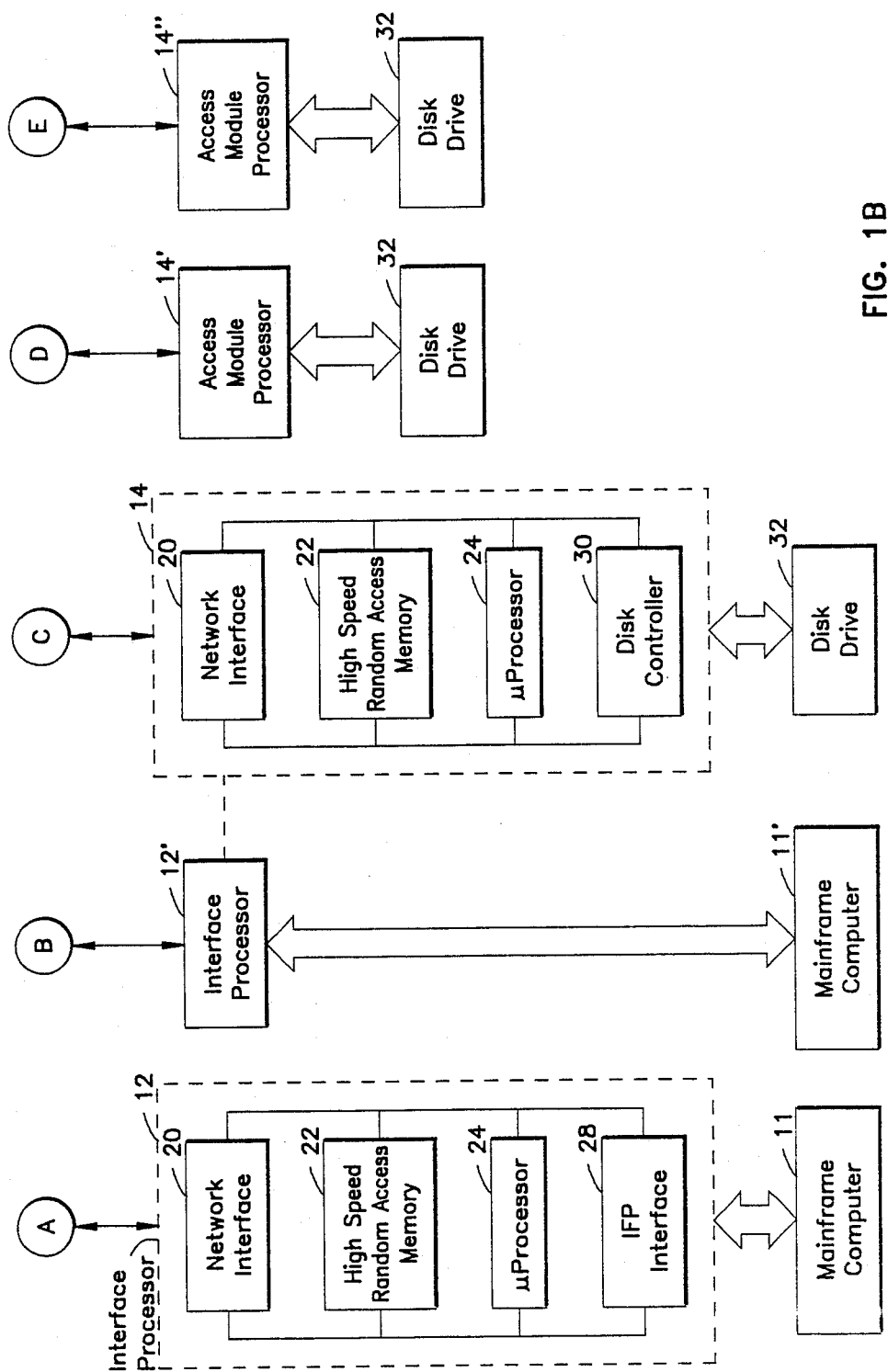

Systems in accordance with the invention, referring now to FIG. 1, advantageously but not necessarily are based on the multiprocessor system of U. S. Pat. Nos. 4,412,285, 4,445,171 and 4,543,630, in which the processors are intercoupled by a bidirectional tree network 10. The system shown and hereafter described is of the type that is configured as a backend relational data base system having massive storage capacity and means for responding, using the data base, to complex queries from one or more mainframe computer systems 11, 11'. The individual processors of the system are categorized either as Interface Processors (IFP) 12, 12' or Access Module Processors (AMPs) 14, 14', 14". Only a few are depicted in FIG. 1, although a very large installation can employ, or be expanded up to, 1024 processors. The Interface Processors 12 interconnect with the mainframe computer 11 by receiving requests and sending assignments by parsing subtasks to the Access Module Processors 14. When the various subtasks have been completed and responses compiled, the Interface Processors 12 return responses to the mainframe system 11. In the data base system, the AMPs 14 are each assigned a substantial body of data stored in individual large memories (e.g. 500 megabyte disk files), and are constantly queuing incoming and outgoing messages from or for the network 10. Within the network 10, a plurality of dynamic nodes 16 are arranged in a tree architecture establishing successive levels until a single node is reached at the $n^{th}$ level. Each node 16 has a pair of bidirectional input ports on the output side of the network 10, and a single bidirectional port coupled to the next level, together with internal logic and clocking circuits for synchronously advancing that competing message having preference in accordance with the established data content protocol. At the top or nth level node 16, clock signals are fed in from a clock source 18, to maintain synchronous transfer in the bidirectional network.

Both IFPs 12 and AMPs 14 are modular processor systems that incorporate network interface circuits 20, including a large high speed Random Access Memory (RAM) 22 on the same bus with the microprocessor 24. When a message gains priority on the network 10 it is broadcast to all IFPs 12 and AMPs 14 but the applicability of the message is only recognized locally by the appropriate network interface circuits 20 as requiring some activity by the associated processor. As described in the referenced patents, the high speed RAM 22 is network accessible, and includes memory sections, as described below, devoted to Destination Selection Words (DSW) that can specifically characterize and identify processors.

The IFPs 12 include interfaces 28 for communication with the mainframe computer 11 busses, while the AMPs 14 include disk controller interfaces 30 for data transfer with the individually associated disk drives 32. For detailed understanding of the general organization and operation of the system of FIG. 1, reference may be made to the previously mentioned patents of Philip M. Neches et al. It should be noted that the redundant networks and circuits shown and described in such patents have been omitted here for brevity and simplicity.

Figure 2:
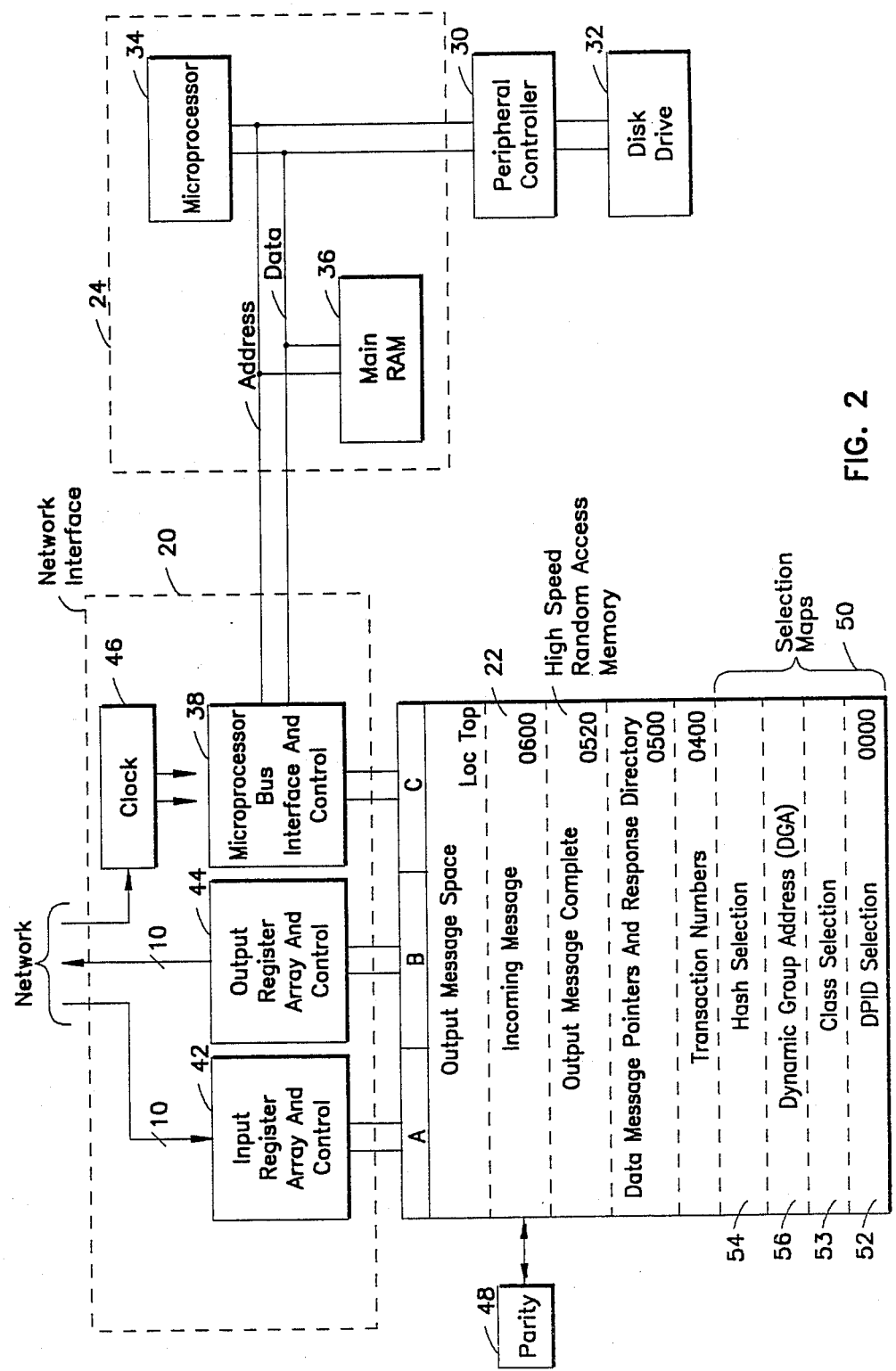
FIG. 2 is a block diagram of a processor module including network interface means for use in the system of FIG. 1.

Further details of a processor, such as an AMP 14, are shown in FIG. 2. The microprocessor system 24 includes the microprocessor 34 and its associated main RAM 36, intercoupled by address and data busses which also couple into microprocessor bus interface and control circuits 38 in the network interface 20. The input register array and control circuits 42, output register array and control circuits 44, and bus interface and control circuits 38 time share the Random Access Memory 22 via A, B, and C ports, respectively. Although the different IFPs and AMPs process transactions asynchronously, clock circuits 46 coupled to the clock lines from the network are used in assuring synchronous data transfer to and from the network 10 of FIG. 1. Parity circuits 48 coupled to the memory 22 function in conventional error detecting and correcting modes.

Within the high speed Random Access Memory 22, the Selection Map section 50 is allotted a predetermined number of addresses, which may arbitrarily vary in size and location but which are here conveniently grouped together, as shown. A DPID (Designated Processor Identification) section 52, which can be relatively small, is used where the associated processor is being addressed specifically so that no further preliminary interchanges or processing is necessary. This section 52, along with a class selection section 53 and a hash selection section 54, are preset during an initialization phase for the overall system. Initialization is a major task inasmuch as it involves selecting generalized groupings of processors for handling anticipated transactions, which constitutes identification of logical process "classes". These classes are necessarily considerably larger than would be ideal for the completion of all subtasks in many different tasks, because of the arbitrary nature and number of functions the system is called upon to perform. The hash selection section 54, also changeable only during initialization, is used in the data base system to enable local recognition, in accordance with a predetermined hashing algorithm, of responsibility for specific parts of a widely distributed data base. The hash selection entries in the memory 22 are seldom changed, because of the complexity of changing the data base distribution or the hashing algorithm.

In accordance with one aspect of the invention, however, a fourth section 56 of the selection map address locations 50 is addressed both locally and remotely for purposes of dynamic partitioning. This section 56 is referred to as the Dynamic Group Address (DGA) section, and comprises a substantial number (e.g. $10^3$ to $10^4$) of addresses for three bit status words. The separate bits have both individual and combinatorial meanings in relation to various functional relationships employed in dynamic partitioning. A substantially greater or lesser number of status word addresses may be allocated to the DGA function, consistent with the desire that there be more than enough locations available for the number of dynamic processor groups likely to be in existence at any one time to avoid the need for substantial search time, but also that significant sectors of memory 22 space not be inactive.

Messages sent to the processors, both IFPs 12 and AMPs 14, incorporate the DGA in the DSW portion of the message, as shown in FIG. 3. For further explanation of the message organization, and the fact that a key field may also be used, see FIGS. 3, 15 and 21A of the Neches et al patents, together with the relevant portions of the specification. When the DGA is employed in the DSW, the Map Code and Map Address may or may not be used.

From what has been said thus far, it should be appreciated that the DGA section 56 of each high speed Random Access Memory 22 in a different IFP 12 or AMP 14 contains, at any point in time, a distribution of status words at the different dynamic group addresses. There words, by their state, indicate whether the processor is or is not a member of a particular dynamic group at that instant and if the dynamic group at that address has been assigned to an active transaction. Actually, referring now to FIG. 4, the eight available states for each status word identify much more than three on-off conditions. A protocol exists as to the meaning of each state, beyond the significance indicated in FIG. 4. The "Valid," "Member" and "Semaphore" designations can have combinatorial as well as individual meanings.

If the all 000's condition exists in every processor, then a group can be allocated at that DGA.

In the next row, for the 001 status word, the value of 1 constitutes a semaphore in the accepted sense of a signal condition which can be tested without ambiguity to indicate status. Without ambiguity means that the testing does not involve a transitory or other change of state during which a conflicting command might alter the status. The semaphore for the dynamic group, when set in some processor, informs the system that no changes in group status are to be made by any other processor. The 001 combination is a preliminary state that enables tests to be made by the affected processor, for example, to determine if any conflict or abort condition exists. Thus this combination may be regarded also as a temporary indication that a dynamic group exists, or has been reserved In this status, however, the processor will not receive either normal messages or abort messages to the group, because it is not yet a member.

The next status word, 010, denotes that the processor has become a member of a dynamic group. The processor will now receive both normal and abort messages to the group. This is the typical operating status word state for the processors which are members of the group. If the subtasks are completed in routine fashion the status words at all processors return to the 000 condition.

If, however, an abort condition arises at any processor in the dynamic group, then the 011 status word is locally set at the processor. This state precludes other processors which are not members of the group yet from joining the group. This state can be used by a processor which initiates an abort of a transaction to unambiguously cause all processors in the system to correctly accept messages relating to abort processing and to prevent processors from accepting new subtasks for the aborting transaction which may be in transit in the system.

The next four states in the tabulation of FIG. 4 correspond to those previously given, except that the "Valid" bit is set to 1, representing the processor which reserved the dynamic group. Thus in 100 and 101 neither normal nor abort messages will be received, while in 110 both types of messages will be received. The 111 state will initiate the abort procedure and result in ultimate release of the group and reversion to the available (000) status word at all the processors. Note that it is not required that the processor which allocated the group be a member of the group: in fact, this is typical in the preferred implementation.

Figure 5A:
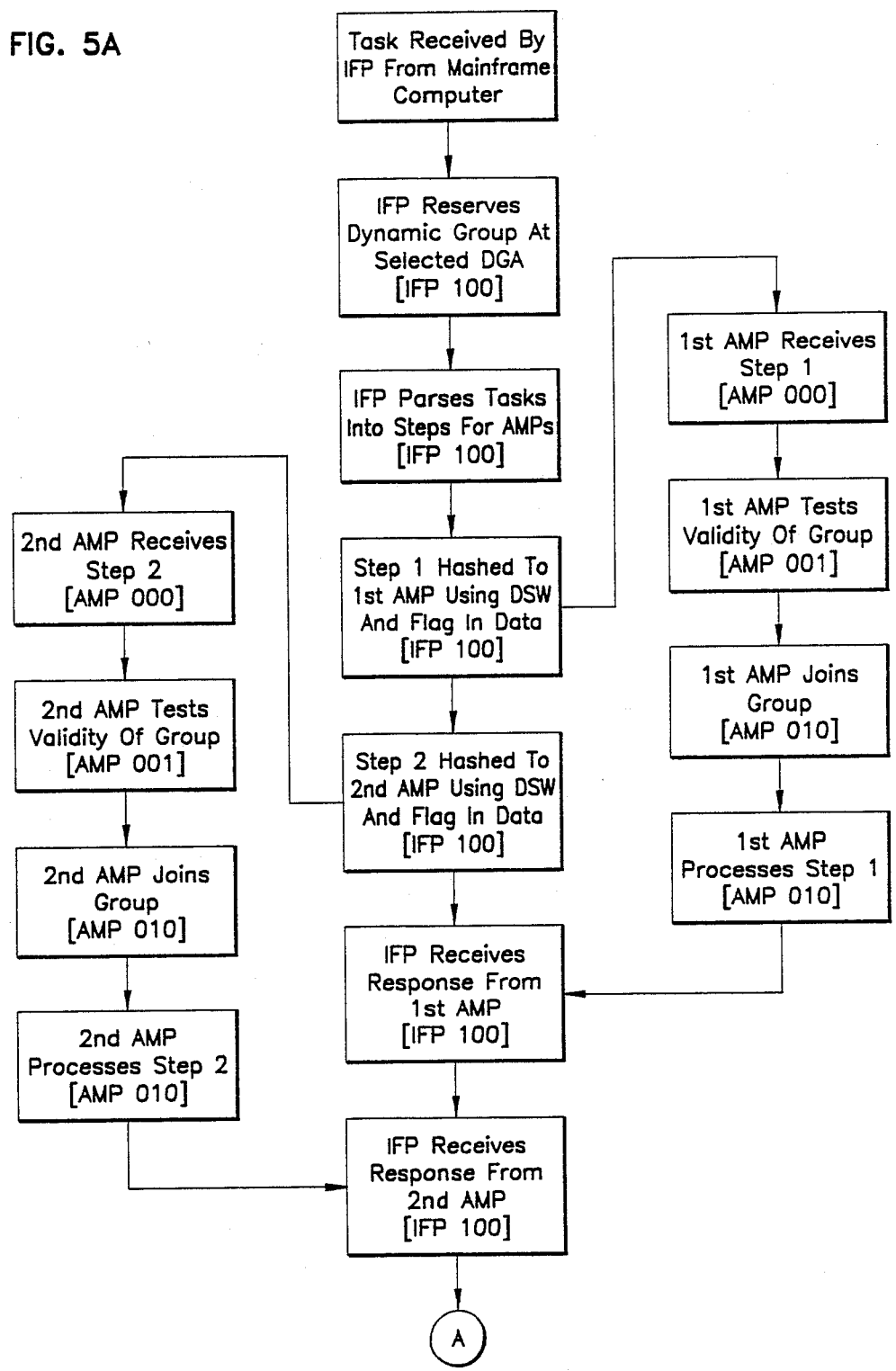
FIGS. 5A and 5B are flow sheets showing successive steps in a method in accordance with the invention.
Figure 5B:
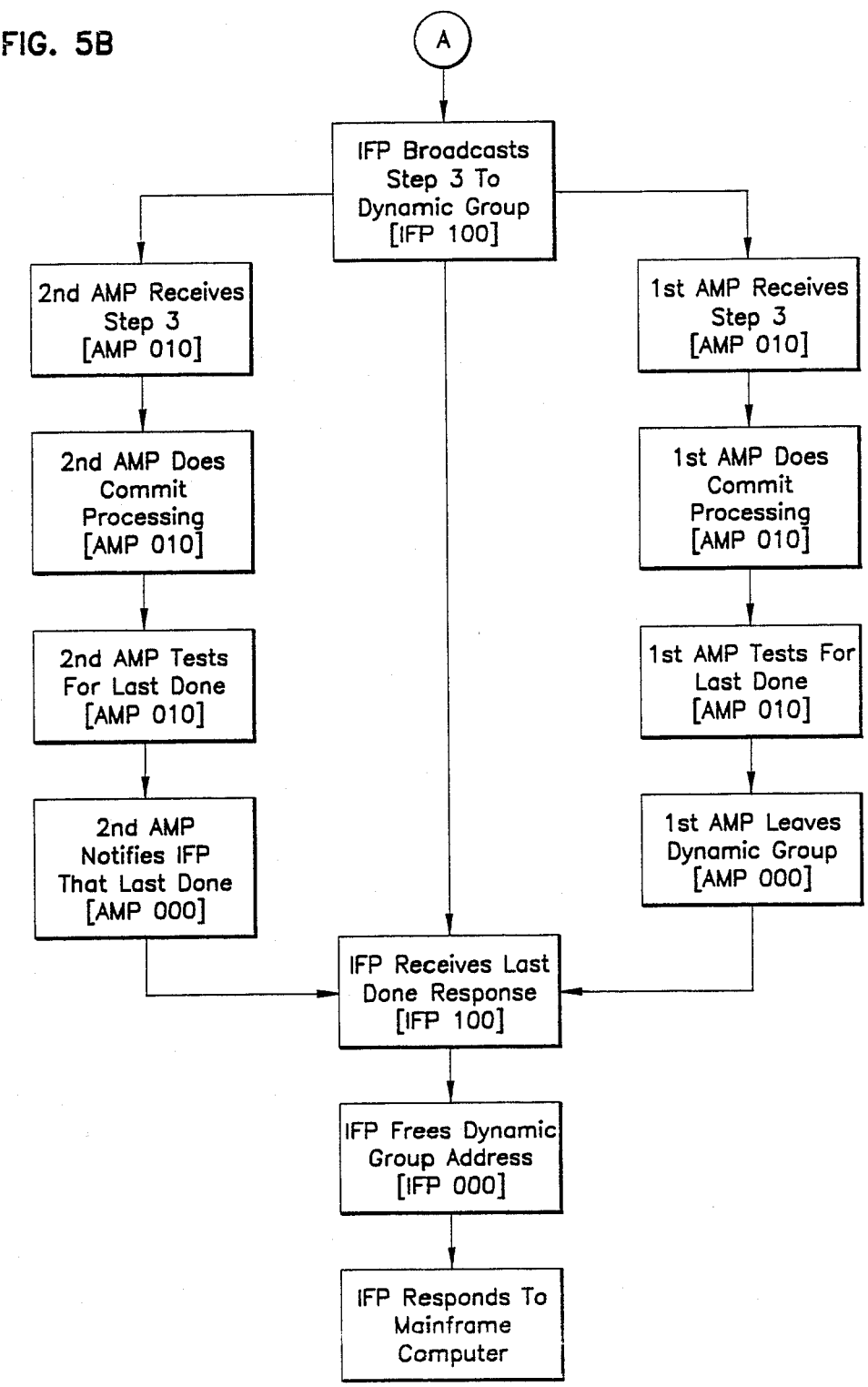
Figure 6:
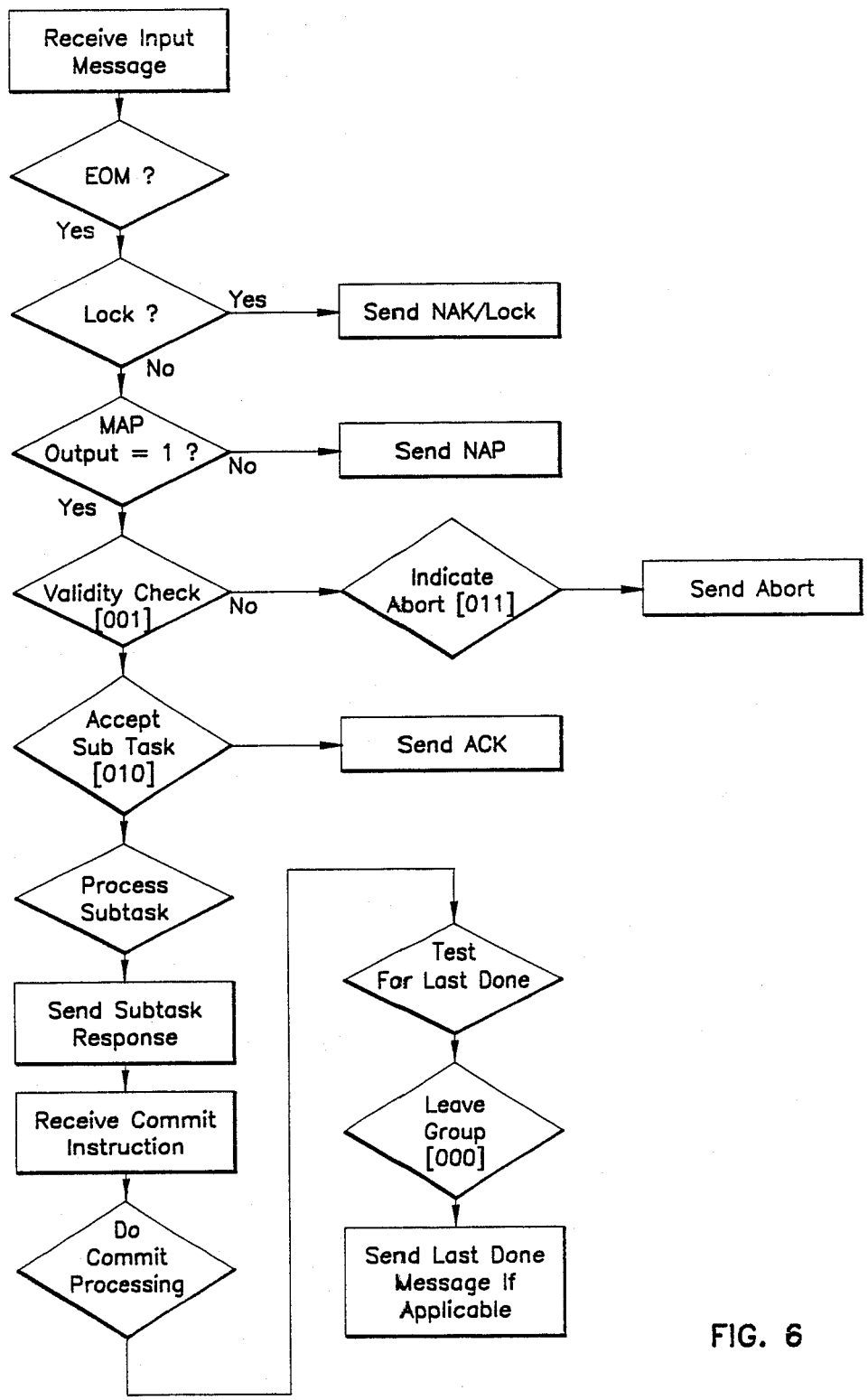
FIG. 6 is a flow sheet showing further details of a method in accordance with the invention.

Operation of the system of FIGS. 1-4 may be better understood by reference to the flow charts of FIGS. 5 and 6. In FIG. 5 the overall sequence involved in setting up a dynamic group and distributing subtasks from an IFP to two related AMPs is set out, with status word changes indicated. The flow chart of FIG. 6 shows more specific steps undertaken at one of the AMPs in carrying out its subtasks and terminating its relationship.

The sequence of steps shown in FIG. 5 is directed to a relatively simple transaction, of the type which was found to require an excessive amount of overhead, particularly when the delineated process classes involved all or a substantial number of the access module processors. Referring briefly to FIG. 1, the system makes use of the capability provided for network 10 access of the high speed random access memories 22 at each processor, together with the capability of the microprocessors 24 for locally updating the contents of the dynamic group addresses in the memory 22. The sequence depicted in FIG. 5 pertains to only one task out of many hundreds that may be carried out concurrently, with the various AMPs 14 queuing input and output messages while also sending status queries and responses on the network 10.

Referring to FIG. 5, the sequence commences with the task being received by an IFP 12 from the mainframe computer 11, for which the IFP locates an available DGA to reserve a dynamic group. This may require a small amount of searching, but in the present example 2500 dynamic group addresses are made available for concurrent processing, which provides an adequate number to cover all expected concurrent tasks, without entailing the use of excessive memory. In reserving the dynamic group, the IFP locally changes the status word at the selected address from 000 to 100, as indicated. In FIG. 5, the state of the DGA word is shown, for example, as "[IFP 000]" to indicate that the DGA word for the IFP has the Valid, Member, and Semaphore bits, respectively, all set to 0. While tasks are ordinarily allocated by the IFPs, this is not a necessary condition inasmuch as any of the AMPs can assume control of performance of a specific task. Recognizing the task to be performed, the IFP parses the steps for AMPs that will be determined to have responsibility for the data, such AMPs being then unknown. In this step, and throughout a successful sequence, the IFP remains in the 100 state.

Step 1 is then sent to a first AMP, using the Destination Selection Word to present the Map Code and the Map Address as appropriate for hashed Mode Message addressing. The first AMP receives the message and recognizes its applicability to that proportion of the data base for which it is responsible. The data field of the message includes an indication that the AMP should do Begin Transaction (BT) processing. The message may (and typically does) indicate other processing that should be performed by the AMP after successfully completing Begin Transaction processing. The first AMP's BT processing includes a test of the validity of the subtask it is to perform by quering the other processors in the dynamic group (there are none others at this particular point), while blocking off conflicting commands with the semaphore bit that indicated that the test for validity is in progress, using the 001 status word. The AMP will find that the group is valid, because of the 100 status word in the IFP. If the AMP found no processor with a valid bit set, it would know that an abort was in process and would not join the group or further process the step. The first AMP then joins the dynamic group, by locally upgrading the status word to 010, and commences processing the subtask Concurrently the IFP sends the second subtask to the second AMP, which undertakes the same validity testing, group joining and processing sequence before transmitting the response message to the IFP. At this point, the IFP coordinates or collates the results of the subtasks, verifying the suitability of a response in a relational data base system, for example. The IFP then broadcasts a third step to both the first and second AMPs in the dynamic group. In this example, the broadcasted step requests all AMPs involved in the transaction to commit changes made to the data base. Each of the first and second AMPs does commit processing, updating or revising the data base to a finalized form. If, on the other hand, some other aspect of the transaction was incorrect, and either AMP or the IFP transmitted an Abort message, this message would also go to the members of the dynamic group, who would institute corrective procedures, with the task results being returned to the IFP. Under normal circumstances, as shown in FIG. 5, at the completion of commit processing, the AMP tests for whether it is the last done, quering the other members of the dynamic group. In this instance the first AMP is not the last done, so it locally updates the status word to 000, effectively leaving the dynamic group. The second AMP determines that it is the last of the group, which is communicates to the IFP as the second AMP reverts the 000 status word. The IFP in its own turn relinquishes the dynamic group, to be available for a subsequent task or transaction, as it directs its response to the mainframe computer.

FIG. 6 demonstrates that, relative to a given processor, transactions require extensive signal interchanges in order to maintain the orderly and coordinated flow of data. When a message containing a hashed address is sent, it is received and the End Of Message and Lock checks are made, an NAK response being sent in accordance with the example of the prior patents if the lock condition exists. The local processor then verifies from the MAP output that the message is intended for that specific processor. If it is not, then a NAP or NAK response may be sent. If it is, then the local processor undertakes the group validity check, having set up the 001 status word, and sending an Abort message if the validity check does not verify the validity of the group. If it does, then the subtask is accepted, the AMP shifting to the 010 status word and sending an ACK message. The subtask is processed, and the message is returned to the IFP. The AMP then waits until authorized by the IFP to undertake commit processing, following which it communicates with other members of the dynamic group to ascertain if it is the last done, and if it is communicates that fact to the IFP or otherwise simply drops out of the group by locally updating the status word to 000.

Substantial advantages derive from this system and method, in that a great many tasks can be carried out concurrently and asynchronously, with the multiple processors being dynamically partitioned into appropriate groups, with group addresses being allocated and subsequently de-allocated as the tasks are completed. Any of the processors can establish such a group, and there is no time limit on the maintenance of the group. Once the group is in existence, however, the need for prefatory and confirmatory status messages is greatly diminished, and the amount of overhead time required of members of a process class that have no specific subtask to perform is greatly diminished.

In contrast to the prior art, many partitions can be in effect simultaneously, and an individual processor can participate in many partitions simultaneously. Also, in sharp contrast to the prior art, the protocols for establishing dynamic partitions and communicating with them do not require additional messages which consume network bandwidth. As shown by the examples, these communications "piggyback" on the message necessary to accomplish the ordinary work flow of the system. Further, there is essentially no overhead involved in sharing the network's use among the many simultaneously existing partitions.

While there have been described above and illustrated in the drawings various forms and modifications in accordance with the invention, it will be appreciated that the invention is not limited thereto but encompasses all expedients and modifications in accordance with the appended claims.

What is claimed is:

1. A system for dynamically partitioning a plurality of parallel processors into different subcombinations for the performance of specific transactions involving limited and variable groupings of processors, comprising:

a plurality of processors, at least some of the processors including means for establishing a sequence of steps for a given transaction, each of the processors including a network interface having a network accessible random access memory storing a fixed length status word at each of a plurality of dynamic grouping addresses;

a network coupled to each of the processors at the network interface thereof and providing messages from any processor concurrently to the processor network interface of all processors, the messages including data for testing the status words at selected dynamic grouping addresses and for establishing membership of a selected processor in one or more groups of a selected dynamic grouping;

the processors each including means for modifying the status words at selected dynamic grouping addresses in their network accessible memory in accordance with the transaction step being performed thereat;

such that a transaction can be carried out at selected processors using processing time only at the selected processors, other processors being isolated from messages received from the network by determining at the network interface whether or not the processor is a participant in a dynamic grouping, and its status relative to the transaction.

2. A system as set forth in claim 1, wherein the status words identify group availability and processor membership and include a semaphore for testing group status.

3. A system as set forth in claim 2, wherein the network interface at each processor includes means for defining a plurality of process classes, preset over a substantial interval and addressable with destination selection words, within which class the dynamic groupings are transitory subsets.

4. A system as set forth in claim 3, wherein the status words include an abort combination such that the processors in the dynamic grouping may be advised of the invalidity of the transaction being undertaken.

5. A system as set forth in claim 4, wherein the status words are three bit codes and include a combination identifying a non-assigned condition.

6. A system as set forth in claim 5, wherein a processor which establishes a step sequence for a given transaction provides a message including an indication to processors that are to be part of a dynamic grouping, and further includes means for testing the dynamic grouping addresses to determine those which are available for assignment, and wherein those processors which are not part of a dynamic grouping return not applicable responses to status queries pertaining to the dynamic grouping.

7. A system for dynamically partitioning tasks, and steps within tasks, among a plurality of processors which perform assignments asynchronously and communicate by sending competing messages concurrently to other processors via a network which sorts in accordance with data content, comprising:

network interface means individually associated with each different processor and including memory means for providing a plurality of network accessible dynamic group storage locations, each having a fixed number of binary digits, each processor being simultaneously assignable to one or more dynamic groups;

the processors including means for identifying via the network those processors having responsibility for different parts of a task and concurrently entering fixed length status words in an available and common dynamic group storage location for each processor; and the processors including means cooperative with the network interface means for locally changing the status words in accordance with (1) the status of the task being undertaken at that processor and (2) while testing is being undertaken.

8. A system as set forth in claim 7, wherein the processors include interface processor means for partitioning steps of a task to different ones of the processors, hash memory section in the memory means in each of the network interface means, and means for generating a destination selection word for addressing the hash memory section and the dynamic group storage location.

9. A system as set forth in claim 8, wherein the interface processor means comprises means for providing a signal to indicate that a processor should join a dynamic group.

10. A system for dynamically partitioning tasks among a plurality of parallel processors interconnected by network means, comprising:

individual interface means intercoupling the different ones of the processors and the network means and including means for storing a plurality of network accessible dynamic group status words in specific locations; and the processors including means for partitioning a task to those other processors taking part in the task each processor being a member of at least one dynamic group by controlling word patterns in a specific location in the interface means for those processors involved in the task;

the interface means including means for intercommunicating with other processors as to the task being performed by addressing the specific location; and the processors including means to locally update the status word in the specific location to reflect changes in the status of the step being performed thereat.

11. A system as set forth in claim 10, wherein the status word includes at least one digit constituting a semaphore, at least one digit representing whether the processor is a member of the dynamic group and at least one digit representing whether the group is reserved or not.

12. A method of carrying out transactions in a multiprocessor system in which processors are addressed concurrently via a network and identify locally whether a message is intended for them, and in which two or more processors are used in a transaction sequence involving multiple steps, comprising the method steps of:

denoting each processor involved in a transaction as a member of at least one dynamic group by a locally stored, network accessible status word while distributing steps to be performed to the processors;

locally maintaining an updated status word for each particular transaction in accordance with the step to be performed at each processor involved in the transaction; and relinquishing the status word from all affected processors when the transaction is complete.

13. A method as set forth in claim 12, wherein the status word is stored in one of a plurality of network addressable locations and includes a semaphore bit that may be externally tested from the network.

14. A method as set forth in claim 13, including the further step of distributing steps to be performed within the transaction sequence by using the dynamic group identification, and monitoring the status of the transaction on a global basis by testing the semaphore bits at the processors involved.

15. A method as set forth in claim 14, wherein the status words are one of a fixed number of predetermined combinations denoting assignability to a group, validity of the group, membership in the group, relinquishment of membership in the group, abort conditions and completion of the assigned transaction step.

16. A method of partitioning related assignments among a number of processors which concurrently process different assignments in asynchronous fashion and which communicate on a data priority basis with other processors via a network, comprising the steps of:

sequencing, at an originating processor, a task to be performed;

establishing by the originating process an available common reference identity for all processors, the common identity being in the form of an externally accessible memory address;

transmitting an assignment to a first execution processor from the originating processor, the assignment including a designation of membership in at least one dynamic group for the memory address;

verifying at the first execution processor that the assignment is not in conflict with other assignments while concurrently locally entering a globally accessible semaphore at the memory address such that an indication is provided that verification is in process;

transmitting further, related, assignments to additional execution processors including a designation of membership in at least one dynamic group for the memory address;

performing the assignments at the execution processors in accordance with priorities and prior assignments;

returning the completed assignments from the execution processors to the originating processor by identifying the selected memory address at the originating processor;

locally changing, at the completion of return of each assignment, the contents of the selected memory address to reflect completion status of the member of the dynamic group;

checking at the completion of each assignment to determine if all assignments related to the dynamic group have been completed; and relinquishing the dynamic group and the selected memory address when the task involving the successive assignment has been completed.

17. A method as set forth in claim 16, including the steps of identifying an abort condition by changing the group status to invalid while retaining the semaphore, and locally restoring data at the execution processors to their preassignment states.

18. A method as set forth in claim 17, wherein any of the processors can be an originating processor and where any number of assignments can be parsed to different execution processors.

19. A method as set forth in claim 18, including the step of providing a plurality of memory addresses for use in identifying assignment, membership status and semaphore status as to different dynamic groups.

20. A method as set forth in claim 19, wherein the memory addresses have three binary digits each, the binary digits being individually related to group assignment, membership status and semaphore respectively, and wherein combinations of the binary digits represent different operating states as to the performance of an assignment.

* * * * *